(12) United States Patent
Chrysos et al.

(10) Patent No.: US 8,902,899 B2
(45) Date of Patent: Dec. 2, 2014

(54) INPUT BUFFERED SWITCHING DEVICE INCLUDING BYPASS LOGIC

(71) Applicant: International Business Machines Corporation, Armonk, NY (US)

(72) Inventors: Nikolaos Chrysos, Thalwil (CH); Anil Pothireddy, Bangalore (IN); Brian T. Vanderpool, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 13/762,583

(22) Filed: Feb. 8, 2013

(65) Prior Publication Data

US 2014/0226675 A1 Aug. 14, 2014

(51) Int. Cl.
*H04L 12/28* (2006.01)
*H04L 12/56* (2006.01)
*G06F 3/00* (2006.01)
*G06F 13/36* (2006.01)
*H04L 12/863* (2013.01)

(52) U.S. Cl.
CPC .................................. *H04L 47/6205* (2013.01)
USPC .................... 370/392; 370/395.3; 370/395.71; 370/412; 370/429; 710/36; 710/310

(58) Field of Classification Search
CPC ....... H04L 12/56; H04L 45/24; H04L 45/745; H04L 45/7457; H04L 47/10; H04L 47/22; H04L 47/30; H04L 47/50; H04L 49/00; H04L 49/15; H04L 49/25; H04L 49/70; H04L 49/90; H04L 49/103; H04L 49/108; H04L 49/109; H04L 49/252–49/254; H04L 49/608; H04L 49/3036; H04L 49/3081; H04L 49/9042; H04L 49/9047; H04L 49/9057; H04L 2012/5652; H04L 2012/5679; H04L 2012/5681; G06F 13/1652; G06F 13/1663
USPC ................. 370/229–240, 251–252, 386–399, 370/395.71, 400, 411–419, 427–429; 710/33, 36, 39, 242, 310, 316–317; 711/151, 138
See application file for complete search history.

(56) References Cited

U.S. PATENT DOCUMENTS

| | | | |
|---|---|---|---|
| 5,299,190 A | | 3/1994 | LaMaire et al. |
| 5,483,521 A | * | 1/1996 | Aramaki ........................ 370/396 |
| 5,689,644 A | * | 11/1997 | Chou et al. .................... 370/392 |
| 6,052,368 A | | 4/2000 | Aybay |
| 6,215,788 B1 | * | 4/2001 | Sakurai et al. ................ 370/391 |

(Continued)

OTHER PUBLICATIONS

McKeown, "The iSLIP Scheduling Algorithm for Input-Queued Switches," IEEE/ACM Transactions on Networking, vol. 7, No. 2; Apr. 1999.

(Continued)

*Primary Examiner* — Tri H Phan
(74) *Attorney, Agent, or Firm* — Toler Law Group

(57) ABSTRACT

A method includes receiving a first packet at an input of a switching device and determining whether to insert first data associated with the first packet into a normal buffer of the input. The determination of whether to insert first data associated with the first packet into the normal buffer includes determining whether the first output identifier matches a second output identifier corresponding to second data in the normal buffer that is associated with a second packet. The first data is inserted into the normal buffer when the first output identifier matches the second output identifier.

20 Claims, 5 Drawing Sheets

(56) References Cited

U.S. PATENT DOCUMENTS

| | | | |
|---|---|---|---|
| 6,735,203 B1 * | 5/2004 | Heiman | 370/394 |
| 6,804,743 B2 * | 10/2004 | Manning | 711/105 |
| 6,888,841 B1 | 5/2005 | Ozaki | |
| 6,954,811 B2 | 10/2005 | Vishnu | |
| 7,158,512 B1 | 1/2007 | Kamhine | |
| 7,173,906 B2 | 2/2007 | Ravi et al. | |
| 7,292,594 B2 | 11/2007 | Meempat et al. | |
| 7,492,782 B2 | 2/2009 | Jun et al. | |
| 7,539,199 B2 | 5/2009 | Shrimali et al. | |
| 7,609,695 B2 | 10/2009 | Zhu et al. | |
| 7,643,493 B1 | 1/2010 | Sayrafian-Pour | |
| 7,778,254 B2 | 8/2010 | Kadambi et al. | |
| 7,826,468 B2 | 11/2010 | Shimizu et al. | |
| 7,830,902 B2 | 11/2010 | Ichimiya et al. | |
| 7,848,341 B2 | 12/2010 | Benner et al. | |
| 8,001,335 B2 | 8/2011 | Chen et al. | |
| 8,059,671 B2 | 11/2011 | Naven et al. | |
| 8,135,024 B2 * | 3/2012 | Abel et al. | 370/412 |
| 8,352,669 B2 | 1/2013 | Wu et al. | |
| 2001/0053157 A1 | 12/2001 | Li | |
| 2003/0191879 A1 | 10/2003 | Marmash | |
| 2004/0083326 A1 | 4/2004 | Wang et al. | |
| 2005/0117575 A1 | 6/2005 | Konda | |
| 2008/0253289 A1 | 10/2008 | Naven et al. | |
| 2010/0272117 A1 | 10/2010 | Wu et al. | |
| 2012/0233349 A1 * | 9/2012 | Aybay | 709/234 |
| 2014/0122771 A1 | 5/2014 | Chrysos et al. | |

OTHER PUBLICATIONS

Hluchyj et al., "Queueing in High-Performance Packet Switching," IEEE Journal on Selected Areas in Communications, vol. 6, No. 9, Dec. 1988.

Bubenik et al., "Performance of a Broadcast Packet Switch," IEEE Transaction Communications, vol. 37, No. 1, Jan. 1989.

Park et al., "NN Based ATM Cell Scheduling with Queue Length-Based Priority Scheme," IEEE Journal on Selected Areas in Communications, vol. 15, No. 2, Feb. 1997.

Karol et al., "Input Versus Output Queueing on a Space-Division Packet Switch," IEEE Transactions on Communications, vol. COM-35, No. 12, Dec. 1987.

Serpanos et al., "FIRM: A Class of Distributed Scheduling Algorithms for High-speed ATM Switches with Multiple Input Queues," IEEE INFOCOM 2000.

Kim et al., "Microarchitecture of a High-Radix Router," Proceedings of the 32nd International Symposium on Computer Architecture (ISCA'05), IEEE, 2005.

Kar et al., "Reduced Complexity Input Buffered Switches," Hot Interconnects 2000; Jul. 16, 2011.

Chrysos et al., "Scheduling in Switches with Small Internal Buffers," Globecom '05, IEEE Global Telecommunications Conference (IEEE Cat. No. 05CH37720), 6 pages, IEEE, 2006.

U.S. Appl. No. 14/012,055 entitled "Implementing Hierarchical High Radix Switch With Timesliced Crossbar," filed Aug. 28, 2013 by Nikolaos Chrysos et al.

* cited by examiner

INPUT BUFFERED SWITCHING DEVICE INCLUDING BYPASS LOGIC

I. FIELD OF THE DISCLOSURE

The present disclosure is generally related to an input buffered switching device including bypass logic.

II. BACKGROUND

High radix switching devices, e.g., switches with many input ports and output ports, are desirable because they can be used to build large networks at relatively low cost. Due to the nature of switching devices, scaling (e.g., designing switches with an increased number of ports) is difficult to achieve. This is because the amount of overhead in scheduling the route of a packet through a data path increases quadratically as the number of inputs and outputs increases. Additionally, scaling may increase occurrences of contention among packets destined for the same output. Due to these limitations, packets arriving at an input of a switching device may be buffered as an arbiter selects which packets will move through the switching device in every switching cycle.

In an input-buffered switching fabric, incoming packets are stored in an input buffer to await arbitration (e.g., the process of being selected by the arbiter as candidates to move through the switch to an output port). A packet in an input buffered switching device may be prevented from participating in arbitration due to head of line blocking by any number of previously received packets that, despite being able to participate in arbitration, are not able to pass through the switch to their respective output port destinations. For example, packets may temporarily be prevented from passing to a hotspot output port (e.g., an output port that is currently congested due to a large number of packets being routed to it). Head of line blocking may reduce performance capabilities of a switching device.

III. SUMMARY OF THE DISCLOSURE

In a particular embodiment, an apparatus includes an input configured to receive a first packet, where the first packet includes a first output identifier corresponding to an output of the apparatus. The input includes a normal buffer, a bypass buffer, and an input arbiter. The input arbiter is configured to determine whether to insert first data associated with the first packet into the normal buffer. When the input arbiter determines that the first data is not to be inserted into the normal buffer, the input arbiter inserts the data into the bypass buffer. The input arbiter determines whether to insert the first data into the normal buffer based at least in part on whether the first output identifier matches a second output identifier corresponding to second data in the normal buffer that is associated with a second packet. When the input arbiter determines that the first output identifier matches the second output identifier, the arbiter inserts the first data into the normal buffer. The apparatus further includes a plurality of outputs and a switching fabric. The input arbiter forwards the first packet to the switching fabric, to be routed to the output, when the first data is within a first set of data in the normal buffer, or when the first data is within a second set of data in the bypass buffer.

In another particular embodiment, a method of input buffering a switching device includes receiving a first packet at an input of the switching device. The first packet includes a first output identifier corresponding to an output of the switching device. The method also includes determining whether to insert first data associated with the first packet into a normal buffer of the input. The determination of whether to insert first data associated with the first packet into the normal buffer includes determining whether the first output identifier matches a second output identifier corresponding to second data in the normal buffer that is associated with a second packet, and inserting first data into the normal buffer when the first output identifier matches the second output identifier.

In another particular embodiment, a computer program product for input buffering a switching device includes a computer readable storage medium having computer readable program code embodied therewith. The computer readable program code is configured to receive a first packet at an input of a switching device. The first packet includes a first output identifier corresponding to an output of the switching device. The computer readable program code is further configured to determine whether to insert first data associated with the first packet into a normal buffer of the input. In order to determine whether to insert first data associated with the first packet into the normal buffer, the computer readable program code is further configured to determine whether the first output identifier matches a second output identifier corresponding to second data in the normal buffer that is associated with a second packet, and insert first data into the normal buffer when the first output identifier matches the second output identifier.

IV. BRIEF DESCRIPTION OF THE DRAWINGS

V. DETAILED DESCRIPTION

A buffering system that reduces effects of head of line blocking in a network switch is disclosed. As incoming packets arrive, an input arbiter compares each packet to entries in a normal buffer. Each incoming packet is placed into the normal buffer or placed in a bypass buffer that may be separate from the normal buffer. For example, the incoming packet may be placed in the normal buffer when the normal buffer has fewer than a threshold number of packets. The incoming packet may be placed in the normal buffer when the bypass buffer has more than a threshold number of packets. The incoming packet may be placed in the normal buffer when the destination of the packet matches the destination of a packet in the normal buffer. The incoming packet may be placed in the normal buffer when the destination of the packet matches the destination of a packet in the bypass buffer. The incoming packet may be placed in the bypass buffer when the packet is not placed in the normal buffer. The input arbiter may select for arbitration any number of packets in the normal buffer or the bypass buffer. Latency within the switching device may be improved by enabling packets with destination outputs that are less congested to bypass packets with congested destination outputs.

Figure 1:
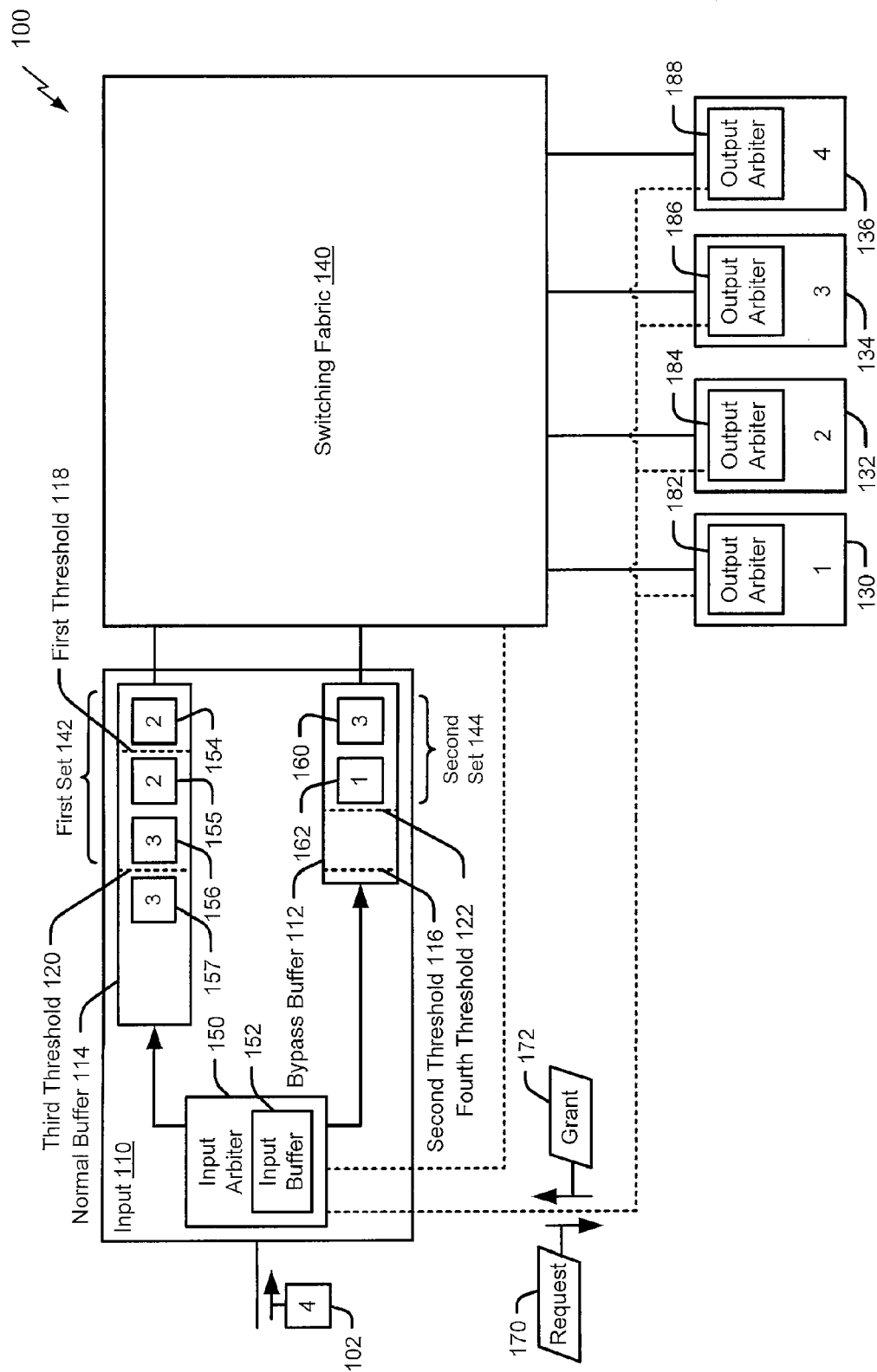
FIG. 1 is a data flow diagram of an embodiment of system that includes an input buffered switching device including bypass logic.

Referring to FIG. 1, a particular illustrative embodiment of an apparatus 100 is shown. The apparatus includes an input 110, a switching fabric 140, and a plurality of outputs. The plurality of outputs may include a first output 130, a second output 132, a third output 134, and a fourth output 136. While a single input 110 has been shown for illustrative purposes, the switching fabric 140 may include or be connected to more than one input. Additionally, while four outputs 130-136 have been shown for illustrative purposes, the switching fabric 140 may include or be connected to fewer than four outputs or more than four outputs.

The input 110 includes a normal buffer 114, a bypass buffer 112, and an input arbiter 150. The normal buffer 114 is shown as including data items associated with received packets. For example, the normal buffer 114 may include a first data item 154, a second data item 155, a third data item 156, and a fourth data item 157. The first data item 154 may be the oldest (e.g., first received) data item in the normal buffer 114, and the data item 157 may be the newest (e.g., last received) data item in the normal buffer 114. Thus, in the particular illustrated embodiment shown in FIG. 1, the right side of the normal buffer 114 may be considered the "front". Each of the data items 154-157 may include a packet received by the input 110 or data associated with a received packet (e.g., a packet notification). In a particular illustrative example, the packet notification may include an output identifier and a pointer. The pointer may correspond to a memory location of a particular received packet and the output identifier may correspond to a targeted destination for routing the particular received packet. In a particular embodiment, the output identifier identifies an address or other unique identifier of one of the outputs 130-136 of the switching fabric 140. For example, each of the data items 154 and 155 shown as stored within the normal buffer 114 include an output identifier of "2." The output identifier of "2" corresponds to the desired routing of the corresponding received packets. Thus, in the example shown in FIG. 1, each of the packets associated with the stored data items 154 and 155 are ready to be routed by the switching fabric 140 to the second output 132. Additionally, each of the packets associated with the stored data items 156 and 157 are ready to be routed by the switching fabric 140 to the third output 134, which corresponds to an output identifier of "3." In a particular illustrative embodiment, the normal buffer 114 is a first-in-first-out (FIFO) queue. While only four data items are shown as stored within the normal buffer, it should be understood that the normal buffer 114 may store more than four data items or fewer than four data items.

The bypass buffer 112 may include one or more data items related to received packets. For example, the bypass buffer 112 is shown as including a fifth data item 160 and a sixth data item 162. The fifth data item 160 may be the oldest (e.g., first received) data item in the bypass buffer 112, and the sixth data item 162 may be the newest (e.g., last received) data item in the bypass buffer 112. Thus, in the particular illustrated embodiment shown in FIG. 1, the right side of the bypass buffer 112 may be considered the "front". In a particular embodiment, each of the data items 160-162 correspond to data associated with a particular packet received by the input 110 in the form of a packet notification as described above. Alternatively, each of the data items 160-162 may include the packets ready for routing through the switching fabric 140. In either case, the data items 160-162 include an output identifier that corresponds to an address indicating the destination output of the corresponding packet. As an example, the fifth data item 160 has an output identifier of three and the sixth data item 162 has an output identifier of one. Thus, in the illustrated case, the fifth data item 160 corresponds to a packet that is ready to be distributed, or routed, by the switching fabric 140 to the third output 134. Similarly, the sixth data item 162 corresponds to a packet that is ready to be routed by the switching fabric 140 to the first output 130. In a particular illustrative embodiment, the bypass buffer 112, like the normal buffer 114, may be implemented as a FIFO queue. In addition, while a single normal buffer 114 and a single bypass buffer 112 have been illustrated, the input 110 may include more than two buffers.

The input arbiter 150 may include an input buffer 152. The input buffer 152 may temporarily store an incoming packet. The input buffer 152 may be located within the input arbiter 150, as shown, or the input buffer 152 may be located in a different location that is accessible by the input arbiter 150. The input arbiter 150 may additionally include decision logic (e.g., arbiter logic) configured to route incoming packets to either the normal buffer 114 or the bypass buffer 112. Alternatively, the decision logic may be configured to extract data from an incoming packet to generate a packet notification including an output identifier, and to route the packet notification to either the normal buffer 114 or the bypass buffer 112. In a particular embodiment, the input arbiter 150 may be implemented as hardware logic. Alternatively, the input arbiter 150 may be implemented as software executed by a processor, or as a combination of software and hardware.

The switching fabric 140 may receive data from the input 110 and may also receive control signals from the input arbiter 150. Thus, the switching fabric 140 may be responsive to the input arbiter 150 and may be configured to switch data from the input 110 to one or more of the outputs 130-136. The switching fabric 140 may be a crossbar switch on a microchip, may be a larger switching network, or any combination thereof.

Each of the outputs 130-136 may include an output arbiter. For example, the first output 130 may include a first output arbiter 182, the second output 132 may include a second output arbiter 184, the third output 134 may include a third output arbiter 186, and the fourth output 136 may include a fourth output arbiter 188. The input arbiter 150 (and input arbiters of other inputs, where there is more than on input) and the output arbiter included in each of the plurality of outputs may form an arbitration system, or scheduler, to forward packets via the switching fabric 140 from a particular input to a particular output based on the destination output of each packet received by the apparatus 100. While FIG. 1 represents the scheduler as an input arbiter 150 included in the input 110, and output arbiters 182, 184, 186, and 188 included in outputs 130, 132, 134, and 136 respectively, the input arbiter 150 and the output arbiters 182-188, or any portions thereof, may be included in the input 110, the switching fabric 140, the outputs 130-136, or other locations accessible to the switching fabric 140.

During operation, the input 110 may receive a plurality of packets, such as the packet 102. While only one packet has been shown in FIG. 1, the input 110 may receive a plurality of packets either as part of a packet stream or via individual packet reception events. The packet 102 includes a first output identifier corresponding to one of the outputs 130-136. In the particular illustrative embodiment shown in FIG. 1, the packet 102 has an output identifier of four (4) (indicating that the destination output of the packet is the fourth output 136). The input arbiter 150, upon receipt of the packet 102 by the input 110, may determine whether to place the packet 102 (or data associated with the packet 102) in the normal buffer 114 or the bypass buffer 112. In one embodiment, the input arbiter 150 may temporarily buffer the packet 102 in the input buffer 152 in order to extract data used to determine which buffer to place the packet 102 in. Alternatively, the input arbiter 150 may extract this information on the fly, without first buffering the packet 102.

In a particular embodiment, the input arbiter 150 is configured to route each incoming packet received at the input 110 either to the normal buffer 114 or to the bypass buffer 112. For example, the input arbiter 150 may determine where to route the packet 102 based at least in part on the output identifier "4" of the packet 102. In particular, the input arbiter 150 may determine whether the output identifier "4" of the packet 102 matches an output identifier corresponding to a data item in the normal buffer 114. For example, the data items 154 and 155 in the normal buffer 114 have output identifiers of "2." Additionally, each of the data items 156 and 157 in the normal buffer 114 has an output identifier of "3." Thus, in this particular case, the output identifier of the packet 102 does not match an output identifier within the normal buffer 114. In response to determining that the output identifier of the packet 102 does not match any of the output identifiers of the data items 154-157 of the normal buffer 114, the packet 102 (or data associated therewith, such as a packet notification) may be routed to and stored within the bypass buffer 112.

In a particular illustrative embodiment, the input arbiter 150 is configured to perform other routing operations. For example, the input arbiter 150 may be further configured to insert the packet 102 (or packet notification) into the normal buffer 114 when a first occupancy of the normal buffer 114 is less than a first threshold 118. For example, in FIG. 1 the first threshold 118 is shown to be one data item. Thus, when the normal buffer 114 is empty (e.g., the number of data items stored within the normal buffer 114 is less than one), the input arbiter 150 stores the packet (or packet notification) to the normal buffer 114. In other embodiments, the first threshold 118 may be greater than one.

The input arbiter 150 may also or in the alternative be configured to insert the packet 102 (or packet notification) into the normal buffer 114 when a second occupancy of the bypass buffer 112 is greater than a second threshold 116. For example, in FIG. 1 the second threshold 116 is shown to be three data items. Thus, when the bypass buffer 112 contains more than three data items (e.g., the bypass buffer is considered to be full), the packet 102 (or packet notification) is inserted into the normal buffer 114. In other embodiments, the second threshold 116 may be greater than three or less than three.

The input arbiter 150 may also or in the alternative be configured to insert the packet 102 (or packet notification) into the normal buffer 114 when the output identifier associated with the packet 102 matches a second output identifier corresponding to a second data item (associated with a second packet) that is stored within the normal buffer 114. For example, if the packet 102 has an output identifier of "2", the packet 102 (or packet notification) may be placed in the normal buffer 114 because the data item 154 also has an output identifier of "2". The input arbiter 150 may insert the packet 102 (or packet notification) into the normal buffer even in cases when the first output identifier matches a third output identifier corresponding to third data associated with a third packet in the normal buffer, where the third identifier indicates a different output than the first output identifier. For example, when the output identifier associated with the packet 102 (in this example "2") matches a second output identifier in the normal buffer 114, the packet 102 may be placed in the normal buffer 114 even though the normal buffer 114 may contain data items 155 and 157 with output identifiers of 3, which is not equal to the output identifier of packet 102.

The input arbiter 150 may also or in the alternative be configured to insert the packet 102 (or packet notification) into the normal buffer 114 when the output identifier of the packet 102 matches a fourth output identifier of a data item within the bypass buffer 112. For example, the packet 102 is shown as having an output identifier of "4". If the bypass buffer 112 contained an additional packet (or packet notification) with an output identifier of "4", then the input arbiter 150 may insert the packet 102 (or packet notification) into the normal buffer 114. The input arbiter 150 may also or in the alternative be configured to insert the packet 102 (or packet notification) into the bypass buffer 112 when the output identifier of packet 102 does not match any output identifier corresponding to any data item in the bypass buffer 112. For example, the output identifier of "4" for the packet 102 does not match any output identifier of the data items 160-162. Thus, the packet 102 (or packet notification) may be inserted into the bypass buffer 112.

Thus, based on the aforementioned rules, the input arbiter 150 may insert packets (or packet notifications) into the normal buffer 114 and the bypass buffer 112, such that no two packets (or packet notifications) in the bypass buffer 112 are directed to the same output, which may reduce head-of-line blocking when considering data in the bypass buffer 112 for output.

The input arbiter 150 may select a packet (or packet notification) from those packets (or packet notifications) stored within a first set of data based on time of arrival (e.g., oldest to most recent). The input arbiter 150 may then route the selected packet (or the packet corresponding to the selected packet notification) via the switching fabric 140 to one of the outputs 130-136. The first set of data may be determined based on a third threshold 120. For example, referring to FIG. 1, the third threshold 120 is three data items. Thus, the three oldest packets within the normal buffer 114 are within a first set of data items 142 that will be considered for forwarding in a next arbitration cycle. The input arbiter 150 may select from among any of the three packets corresponding to the three data items 154-156 within the first set of data items 142. In other embodiments the third threshold 120 may be greater than three or less than three.

Alternatively, or in addition, the input arbiter 150 may select one or more packets (or packet notifications) within a second set of data items 144 stored within the bypass buffer 112. In response to the input arbiter 150 selecting a packet (or packet notification) corresponding to any of the data items 160-162 within the second set of data items 144, the selected packet (or the packet corresponding to the selected packet notification) may be routed by the switching fabric 140 to a target destination output based on the output identifier of the selected packet (or packet notification). For example, if the input arbiter 150 selects the data item 160, the packet (or packet notification) corresponding to data item 160 is routed by the switching fabric 140 to the third output 134. The second set of data items 144 may include a number of packets (or packet notifications) less than a fourth threshold 122. In FIG. 1, the fourth threshold 122 is two data items. In other embodiments, the fourth threshold 122 may be greater than 2 or less than 2. For example, either the third threshold 120 or the fourth threshold 122 may be zero, indicating that only packets from one of the normal buffer 114 and the bypass buffer 112 are to be selected by the input arbiter 150. In a particular embodiment, a sum of the third threshold 120 and the fourth threshold 122 is equal to a constant representing a capacity of the input arbiter 150, and one of the thresholds 120 and 122 may decrease when the other of the thresholds 120 and 122 increases.

In an illustrative embodiment, the input arbiter 150 may be configured to send a request 170 to each output identified by the output identifiers of the data items included in the first set of data items 142 and the second set of data items 144. For example, in the particular embodiment shown in FIG. 1, the first set of data items 142 includes data items with output identifiers indicating the outputs 132 and 134. Additionally, the second set of data items 144 includes data items with output identifiers indicating the outputs 130 and 134. Thus, in the example, the input arbiter 150 would send a request to the outputs 130, 132, and 134. Each request indicates to the receiving output (e.g., the outputs 130-134) that at least one packet at the input 110 is ready to be forwarded through the switching fabric 140 to the receiving output.

In a particular illustrative embodiment, the output arbiter 182-188 of each output 130-136 that receives a request determines whether the request is to be granted. The request may be granted if the output arbiter determines that the output is capable of receiving a packet from the input 110 during that particular switching cycle. If the request is granted, then the output arbiter (e.g., one or more of the output arbiters 182-186) sends a grant 172 to the input arbiter 150. The grant 172 indicates to the input arbiter 150 that the output (e.g., one or more of the outputs 130-134) that sent the grant 172 is ready to receive a packet. The input arbiter 150 then selects the appropriate packets (or packet notifications) and configures the switching fabric 140 to forward the packets to the appropriate destination outputs.

By determining whether to place each packet (or packet notification) in either the normal buffer 114 or the bypass buffer 112 based at least in part on an output identifier of each packet, routing of particular packets in terms of latency and latency efficiency in bandwidth may be improved. For example, when a number of packets are stored in the normal buffer 114 that each have the same destination, a received packet having a different destination may beneficially be stored in the bypass buffer 112 in order to expedite routing. For example, in FIG. 1 the normal buffer 114 includes four data items (e.g., packets or packet notifications) having output identifiers of "2" and "3." A newly received packet with an output identifier other than "2" or "3" may be more quickly routed through the switching fabric 140 to the corresponding destination via the bypass buffer 112 than via the normal buffer 114.

Figure 2:
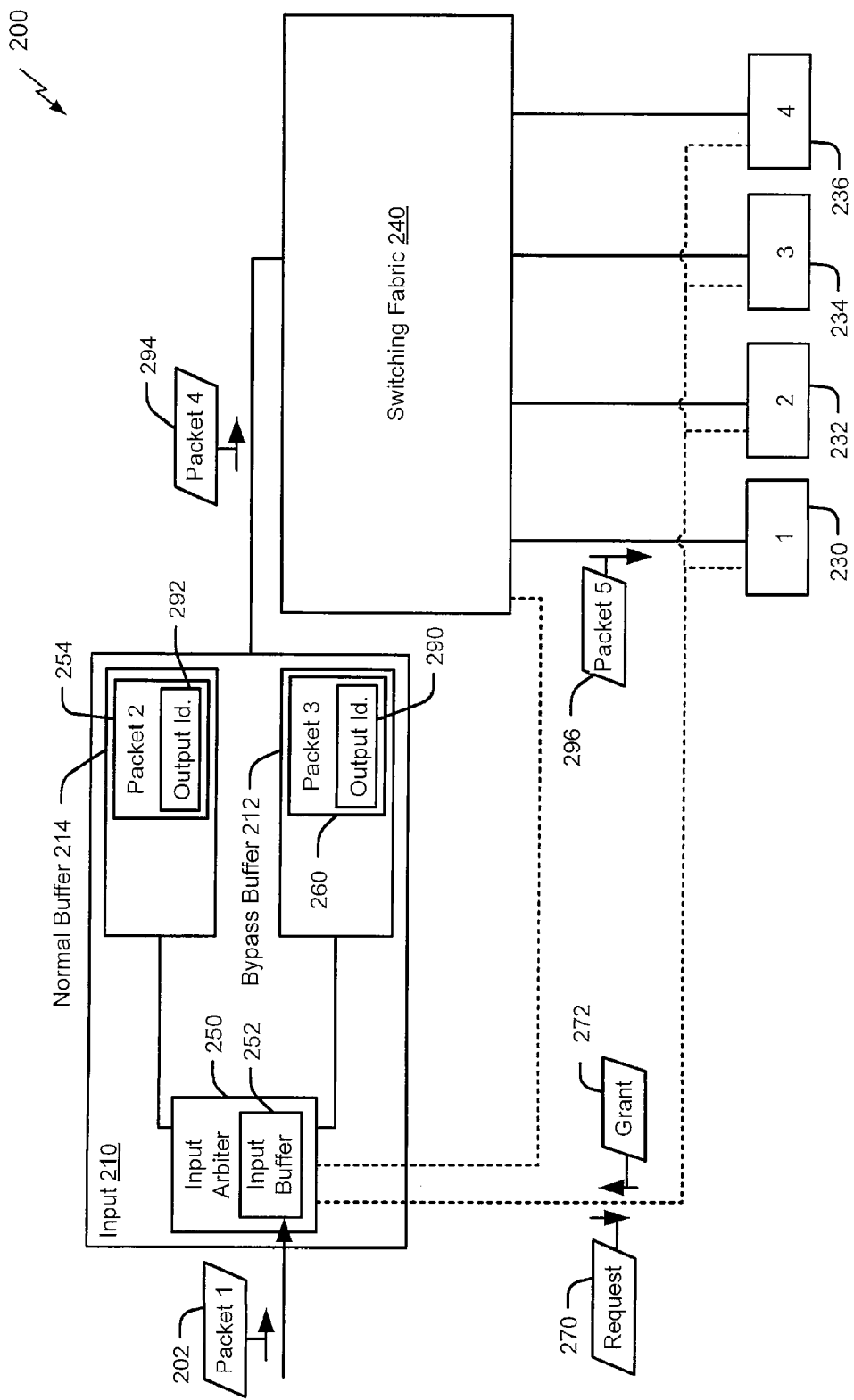
FIG. 2 is a block diagram of the system of FIG. 1 according to an embodiment in which an input arbiter stores packets in a normal buffer and a bypass buffer.

Referring to FIG. 2, another embodiment of an apparatus 200 that includes an input 210, a switching fabric 240, and outputs 230, 232, 234, and 236 is shown. The input 210 may be configured to receive one or more packets, such as a representative packet 202. The input 210 may include a normal buffer 214, a bypass buffer 212, and an input arbiter 250. The normal buffer 214 may correspond to the normal buffer 114 of FIG. 1, the bypass buffer 212 may correspond to the bypass buffer 112, the input arbiter 250 may corresponds to the input arbiter 150, the switching fabric 240 may correspond to the switching fabric 140, and the outputs 130-136 may correspond to the outputs 230-236, respectively, with respect to the apparatus 100 illustrated in FIG. 1. In the example illustrated in FIG. 2, data items stored in the bypass buffer 212 and the normal buffer 114 are packets. Thus, the bypass buffer 212 and the normal buffer 214 may each include packets, where each packet has an output identifier. For example, the bypass buffer 212 is illustrated as storing a first packet 260, which includes a first output identifier 290, and the normal buffer 214 is illustrated as storing a second packet 254, which includes a second output identifier 292. While only one packet is shown as stored in each of the bypass buffer 212 and the normal buffer 214, each buffer 212, 214 may store more than one packet.

The input arbiter 250 may be configured to retrieve packets stored in the normal buffer 214 or the bypass buffer 212 and to communicate the packets to the switching fabric 240. For example, a packet 294 is shown as being forwarded to the switching fabric 240. Once the packet 294 has been communicated to the switching fabric 240, the packet 294 is routed through the switching fabric to a particular designated output. For example, a packet 296 is shown as being routed to an output 230.

During operation, the packet 254 may be retrieved from the normal buffer 214 and communicated to the switching fabric 240. The switching fabric 240 may be configured by the input arbiter 250 to route the packet 254 to an output corresponding to the output identifier 292. In a particular example, if the output identifier 292 identifies a second output 232, the packet 254 may be routed to the second output 232. Alternatively, the output identifier 292 may identify another type of address that uniquely identifies one of the outputs 230-236. In the apparatus 200, the switching fabric 240 is shown as including four outputs (output 230, output 232, output 234, and output 236). In other embodiments, the switching fabric 240 may include fewer than four outputs or more than four outputs. In addition, the switching fabric 240 may receive packets from more than one input.

The input arbiter 250 may include logic to compare an output identifier corresponding to each received packet to output identifiers of packets that have previously been received and stored in the normal buffer 214 and the bypass buffer 212, and to determine whether the received packet is to be routed for storage within the normal buffer 214 or the bypass buffer 212. For example, when the output identifier of the packet 202 matches the output identifier 292 of the packet 254 stored within the normal buffer 214, the packet 202 may be routed and stored within the normal buffer 214. Otherwise, if the output identifier of packet 202 does not match the output identifier 292 of the packet 254, then the input arbiter 250 may route the packet 202 to the bypass buffer 212.

In a particular illustrative embodiment, the input arbiter 250 is further configured to perform other routing operations. For example, the input arbiter 250 may be further configured to insert the received packet 202 into the normal buffer 214 when a first occupancy of the normal buffer 214 is less than a first threshold. The input arbiter 250 may also or in the alternative be configured to insert the received packet 202 into the normal buffer 214 when a second occupancy of the bypass buffer 212 is greater than a second threshold. The input arbiter 250 may also or in the alternative be configured to insert the received packet 202 into the normal buffer 214 when the first output identifier associated with the received packet 202 matches a second output identifier of a packet within the normal buffer 214. The input arbiter 250 may be configured to insert the first data into the normal buffer 214 even when the output identifier of packet 202 matches a third output identifier of a third packet in the normal buffer 214, where the third output identifier is different than the first output identifier. The input arbiter 250 may also or in the alternative be configured to insert the received packet 202 into the normal buffer 214 when the first output identifier from the packet 202 matches the output identifier 290 of a fourth packet 260 within the bypass buffer 212. The input arbiter 250 may also or in the alternative be configured to insert the received packet 202 into the bypass buffer 212 when the first output identifier of the received packet 202 does not match any output identifier corresponding to any packets in the bypass buffer 212.

In an illustrative embodiment, the input arbiter 250 is configured to send a request 270 to each output identified by an output identifier of the packets of a set of packets within the normal buffer 214 and packet of a set of packets within the bypass buffer 212. The request 270 indicates to the receiving output that the input 210 from which the request 270 was received is ready to forward a packet through the switching fabric 240 to the output.

An output arbiter of each output that receives a request 270 may determine whether the request is to be granted. The request may be granted if the particular output arbiter determines that the particular output is capable of receiving a packet from the input 210 during a particular switching cycle. If the request is granted, then the granting output arbiter may send a grant message 272 to the input arbiter 250. The grant message 272 indicates to the input arbiter 250 that the output that sent the grant message 272 is ready to receive a packet. The input arbiter 250 then selects the appropriate packet or packets and configures the switching fabric 240 to forward the packet or packets to the appropriate destination outputs.

Figure 3:
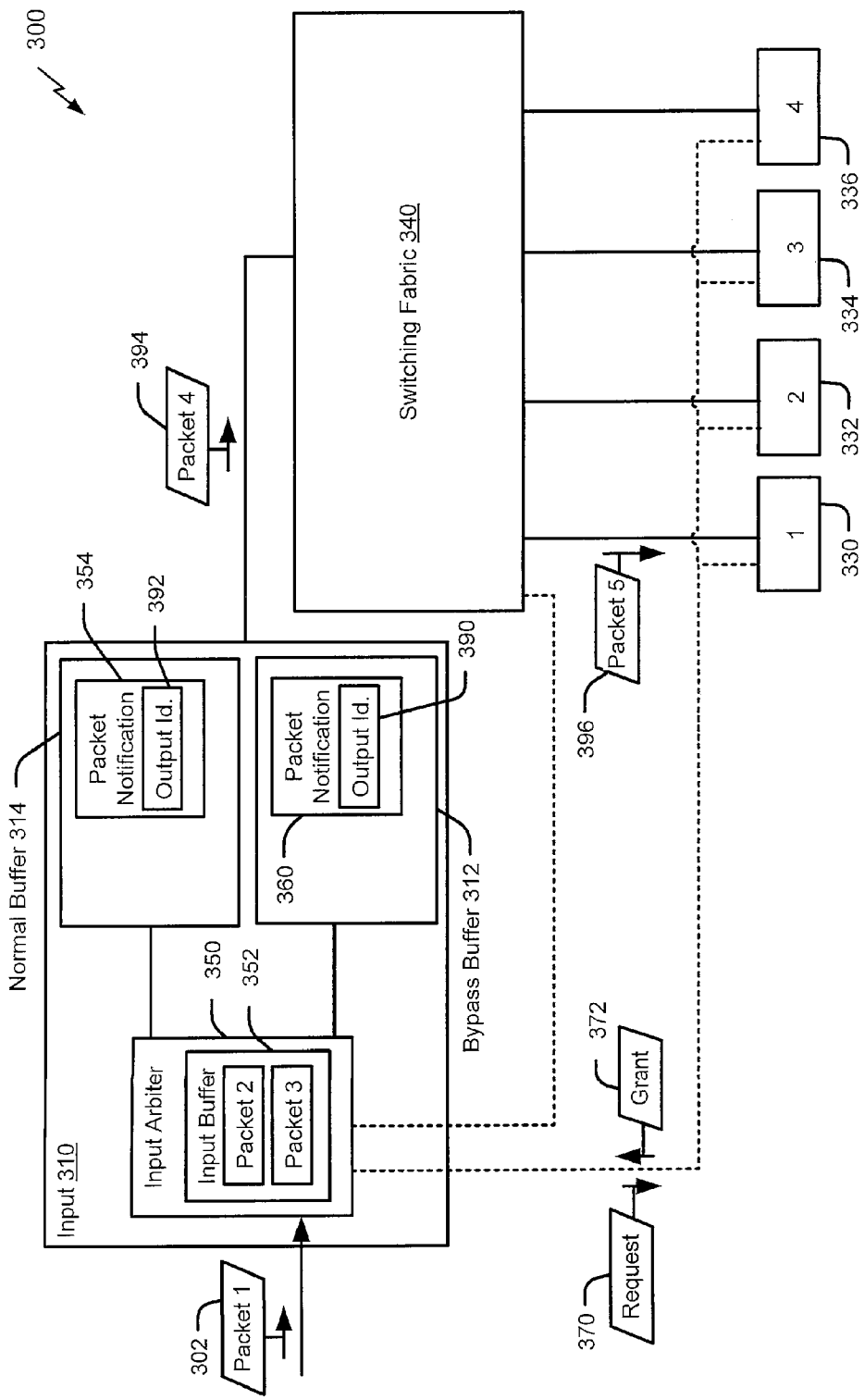
FIG. 3 is a block diagram of the system of FIG. 1 according to an embodiment in which an input arbiter stores packet notifications in a normal buffer and a bypass buffer.

Referring to FIG. 3, another embodiment of an apparatus 300 is shown. The apparatus 300 includes an input 310 coupled to switching fabric 340. The input 310 receives one or more packets and may forward the packets to the switching fabric 340. The input 310 includes a normal buffer 314, a bypass buffer 312, and an input arbiter 350. Whereas FIG. 2 illustrates an embodiment in which packets are stored in the buffers 214, 212, FIG. 3 illustrates an embodiment in which packet notifications are stored in buffers 314, 312 of an input 310. A packet notification may include an output identifier and a pointer. The output identifier may indicate an output to which a corresponding packet should be forwarded, and the pointer may indicate a location of the corresponding packet. For example, the output may be one or more of outputs 330-336. The location indicated by the pointer may be a memory location within in an input buffer 352 of the input arbiter 350 or another memory location accessible by the input arbiter 350. The normal buffer 314 may correspond to the normal buffer 114, except that the normal buffer 314 stores packet notifications. Additionally, the bypass buffer 312 may correspond to the bypass buffer 112, except that the bypass buffer 312 stores packet notifications. Additionally, the input arbiter 350 may correspond to the input arbiter 350, except that the input arbiter 350 generates a packet notification and contains logic to determine whether to store the packet notification in the normal buffer 314 or the bypass buffer 312. Additionally, the switching fabric 340 may correspond to the switching fabric 140, and the outputs 330-336 may correspond to the outputs 130-136, respectively, with respect to the apparatus 100 illustrated in FIG. 1.

The switching fabric 340 includes switching logic and is configurable by the input arbiter 350 to route data received by the input 310 to one of a plurality of outputs 330-336. For example, the switching fabric 340 may be configured to route a particular packet, such as the illustrated packet 396, to a designated output determined by the output identifier of packet 396. The illustrated outputs 330-336 include a first output 330, a second output 332, a third output 334, and a fourth output 336. The output identifier of the packet 394 includes a value that corresponds to one of the four outputs 330-336, as described herein.

During operation, the input 310 may receive packets, such as the illustrated packet 302. The packet 302 may include an output identifier. The input arbiter 350 may include an input buffer 352. A received packet may be buffered in the input buffer 352 to enable processing of the received packet by the input arbiter 350 to place the received packet in the normal buffer 314 or the bypass buffer 312.

The input arbiter 350 may also evaluates the output identifier of incoming packets as compared to output identifiers corresponding to data stored within the normal buffer 314 and the bypass buffer 312. In a particular embodiment, the normal buffer 314 includes a plurality of packet notifications, each packet notification including an output identifier value corresponding to a particular output to which a packet is to be routed by the switching fabric 340. Similarly, the bypass buffer 312 includes a plurality of packet notifications and each packet notification includes an output identifier and other information to route packets through the switching fabric 340. By storing packet notifications instead of packets, storage space for the normal buffer 314 and the bypass buffer 312 may be reduced. In the example shown, the normal buffer 314 includes a packet notification 354, which includes an output identifier 392. Similarly, the bypass buffer 312 includes a packet notification 360, which includes an output identifier 390.

The input arbiter 350 may compare a first output identifier of the received packet 302 to each of the output identifiers stored within the normal buffer 314. In response to determining that the first output identifier of packet 302 matches a second output identifier (e.g., the output identifier 392) stored within the normal buffer 314, the input arbiter 350 may generate a packet notification (including the output identifier of packet 302) and route the packet notification for storage within the normal buffer 314. If the output identifier does not match any of the output identifiers stored within the normal buffer 314, then the input arbiter 350 may route the packet notification to the bypass buffer 312.

In a particular illustrative embodiment, the input arbiter 350 is further configured to perform other routing operations. For example, the input arbiter 350 may be configured to insert the packet notification associated with the received packet 302 into the normal buffer 314 when a first occupancy of the normal buffer 314 is less than a first threshold. The input arbiter 350 may also or in the alternative be configured to insert the packet notification into the normal buffer 314 when a second occupancy of the bypass buffer 312 is greater than a second threshold. The input arbiter 350 may also or in the alternative be configured to insert the packet notification into the normal buffer 314 when the first output identifier associated with the received packet 302 matches a second output identifier of a packet notification within the normal buffer 314. The input arbiter 350 may also or in the alternative be configured to insert the packet notification into the normal buffer 314 when the output identifier from the packet notification matches an output identifier of a packet notification in the bypass buffer 312. The input arbiter 350 may also or in the alternative be configured to insert the packet notification into the bypass buffer 312 when the first output identifier of the received packet 302 does not match any output identifier corresponding to any packet notifications in the bypass buffer 312.

After the packet notification is stored within either the normal buffer 314 or the bypass buffer 312, in response to selection by the input arbiter 350, packet notification information may be retrieved from either the normal buffer 314 or the bypass buffer 312 and used by the input arbiter 350 to forward the associated packet through the switching fabric 340. For example, the input arbiter 350 may instruct the switching fabric 340 to route and direct the packet corresponding to the packet notification to one of the outputs as designated by the output identifier. For example, FIG. 3 shows a packet 394 being routed to the switching fabric 340 from the input 310. Additionally, FIG. 3 shows a packet 396 being routed to the first output 330.

In one illustrative embodiment, the input arbiter 350 is further configured to send a request 370 to each output identified by an output identifier of a packet notification included in a set of packet notifications of the normal buffer 314 and a set of packet notifications of the bypass buffer 312. The request 370 indicates to the receiving output that at least one packet is ready to be forwarded through the switching fabric 340 to the output.

In a particular illustrative embodiment, an output arbiter of each output that receives a request determines whether the request received from the input arbiter 350 is to be granted. A request may be granted if the particular output arbiter determines that the particular output is capable of receiving a packet from the input 310 during a particular switching cycle. If the request is granted, then the granting output arbiter sends a grant message 372 to the input arbiter 350. The grant message 372 indicates to the input arbiter 350 that the output is ready to receive a packet. The input arbiter 350 then selects the appropriate packet or packets and configures the switching fabric 340 to forward the packet or packets to the appropriate destination outputs. For example, FIG. 3 shows a packet 394 being forwarded to the switching fabric 340. The packet 394 is routed by the switching fabric 340 according to command or control information provided by the input arbiter 350.

Figure 4:
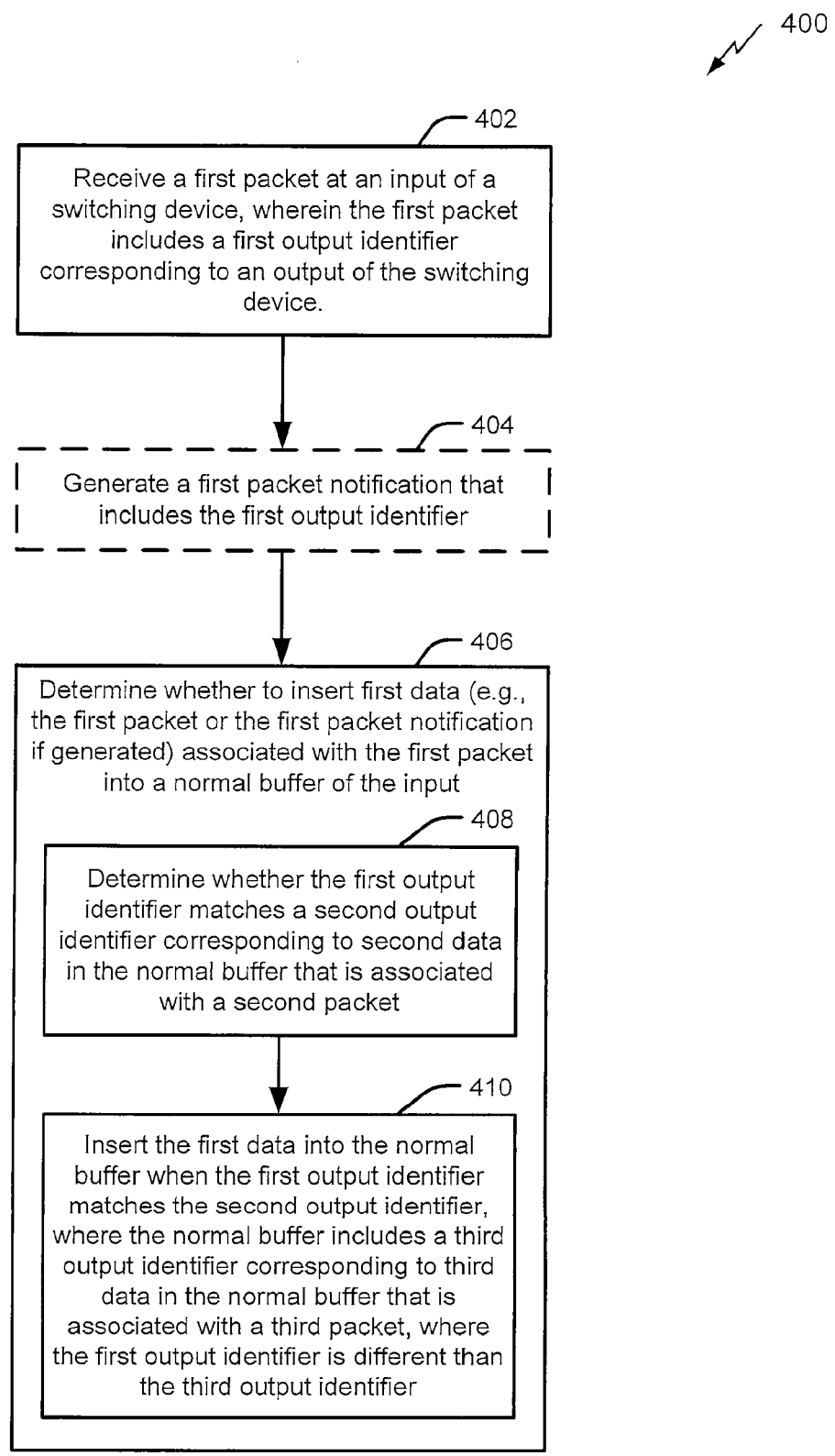
FIG. 4 is a flow diagram of a first embodiment of a method of input buffering a switching device including a bypass buffer and bypass logic.

Referring to FIG. 4, a particular illustrative embodiment of a method 400 of processing received packets in order to determine whether to bypass an input buffer that is accessible to an input of a switching device is shown. The method 400 includes, at 402, receiving a first packet at an input of a switching device, where the first packet includes a first output identifier corresponding to an output of the switching device. For example, the first packet may correspond to the packet 102 illustrated in FIG. 1. The packet 102 may be received by the input 110 and may be forwarded to the switching fabric 140. The packet 102 includes a first output identifier that corresponds to an output of the switching fabric 140. For example, the first output identifier may be "4," corresponding to the fourth output 136 of the switching fabric 140.

In a particular example, the method 400 includes generating a first packet notification that includes the first output identifier, at 404. The method 400 may include determining whether to insert first data (e.g., the first packet or the first packet notification if generated at 404) associated with the first packet into a normal buffer of the input, at 406. For example, referring to FIG. 2, the packet 254 having the output identifier 292 is stored within the normal buffer 214. Alternatively, a packet notification within the normal buffer may include a portion of the packet or other data that identifies the packet. For example, referring to FIG. 3, the normal buffer 314 may store the packet notification 360 that includes the output identifier 390. Thus, the first data may either include an entire packet having an output identifier or other data that corresponds to a packet and that also includes the output identifier.

The decision of whether to insert first data associated with the first packet into the normal buffer of the input includes determining whether the first output identifier matches a second output identifier corresponding to second data in the normal buffer, at 408. The second data is associated with a second packet. For example, referring to FIG. 1, the input arbiter 150 may determine whether a first output identifier of a first packet, such as the packet 102, matches a second output identifier corresponding to second data in the normal buffer 114. For example, in a particular embodiment, the normal buffer 114 may include data items 154, 155, 156, and 157. The data items 154 and 155 have an output identifier of "2." The data items 156 and 157 have a packet identifier of "3." The input arbiter 150 may determine that the packet 102, which has an output identifier of "4," does not match a second output identifier corresponding to second data in the normal buffer 114.

The method 400 further includes inserting the first data into the normal buffer when the first output identifier matches the second output identifier, at 410. The first data may be inserted into the normal buffer even when the normal buffer contains a third output identifier corresponding to third data in the normal buffer that is associated with a third packet, where the first output identifier is different than the third output identifier. For example, the first data (which may include a portion of the packet, the entire packet, or other data identifying a particular packet) may be inserted into a normal buffer. Although not illustrated in FIG. 4, a packet that is not inserted into the normal buffer, at 410, may be inserted into a bypass buffer. As an example, the bypass buffer may be any of the bypass buffers 112, 212, or 312. The normal buffer may be any of the illustrated normal buffers 114, 214, or 314 as illustrated in FIGS. 1-3.

Figure 5:
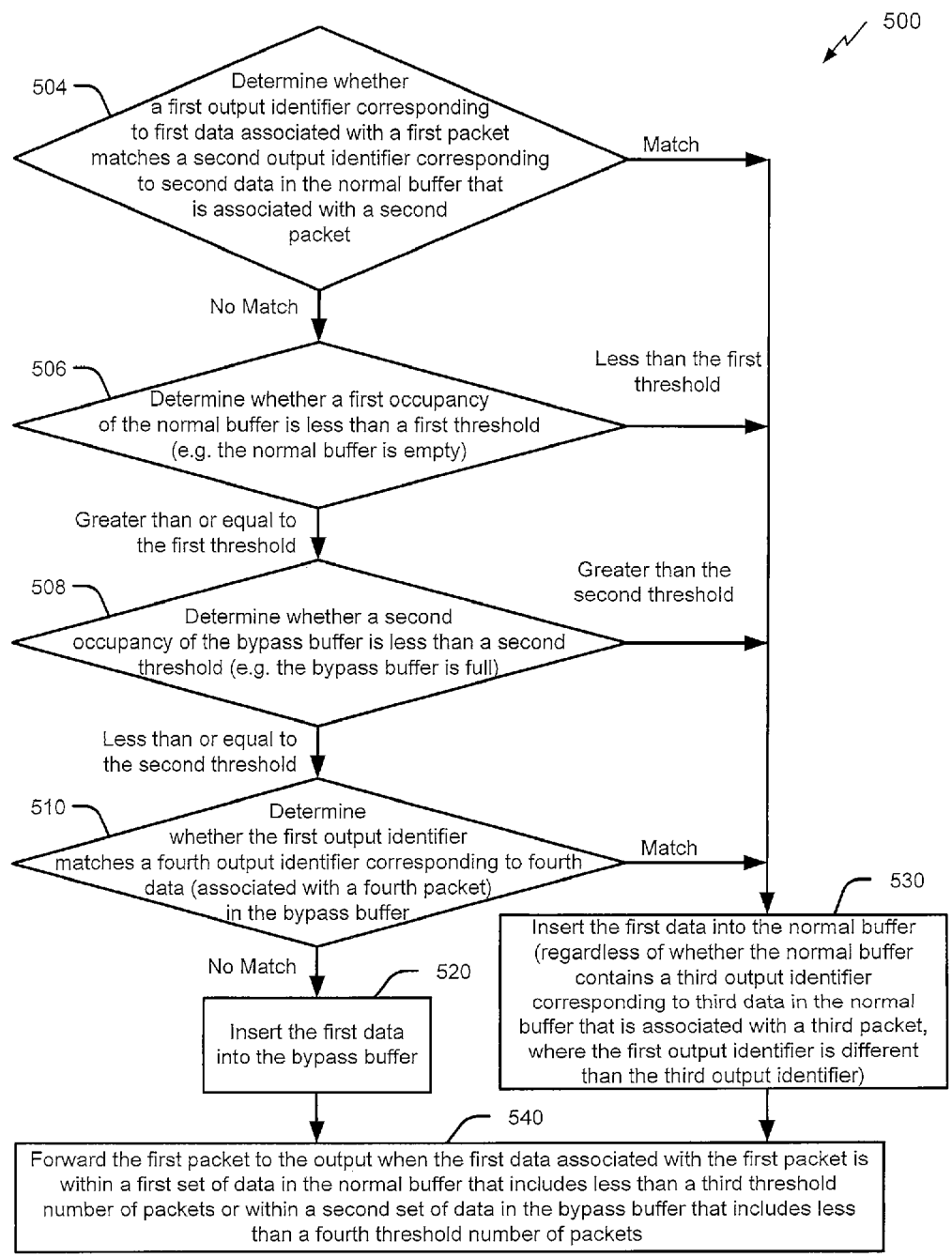
FIG. 5 is a flow diagram of a second embodiment of a method of input buffering a switching device including a bypass buffer and bypass logic.

Referring to FIG. 5, a particular illustrative embodiment of a method 500 used by an input arbiter (e.g., the input arbiter 150, 250, or 350) of determining whether to insert first data associated with the first packet into a normal buffer is shown. The method 500 includes, at 504, determining whether a first output identifier corresponding to first data associated with a first packet matches a second output identifier corresponding to second data in the normal buffer that is associated with a second packet. If a match is found, then the method 500 proceeds to 530, and the input arbiter inserts the first data into the normal buffer. In a particular embodiment, the input arbiter inserts the first data into the normal buffer even in cases when the normal buffer includes a third output identifier corresponding to third data in the normal buffer that is associated with a third packet, where the first output identifier is different than the third output identifier (e.g., there is a third output identifier in the normal buffer that does not match the first output identifier). The second data and the third data may include either packet notifications or packets. When no match is found between the first output identifier and any output identifier in the normal buffer, the method 500 continues to 506.

At 506, the input arbiter determines whether a first occupancy of the normal buffer is less than a first threshold. For example, referring to FIG. 1, the input arbiter 150 determines whether the occupancy of normal buffer 114 is less than the first threshold 118 (e.g., one). When the occupancy of the normal buffer is less than the first threshold, the method 500 continues to 530, and the input arbiter inserts the first data into the normal buffer. For example, if the normal buffer 114 of FIG. 1 is empty (e.g., the occupancy of the normal buffer 114 is less than the first threshold 118) then the input arbiter 150 inserts the first data into the normal buffer 114. When the occupancy of the normal buffer is greater than or equal to the first threshold number, the method 500 continues to 508.

At 508, the input arbiter determines whether a second occupancy of the bypass buffer is less than a second threshold. For example, referring to FIG. 1, the input arbiter 150 determines whether the occupancy of the bypass buffer 112 is less than the second threshold (e.g., three). When the occupancy of the bypass buffer is greater than the second threshold, the method 500 continues to 530, and the input arbiter inserts the first data into the normal buffer. For example, if the bypass buffer 112 is full (e.g., the occupancy of the bypass buffer 112 is greater than or equal to the second threshold 116) then the input arbiter 150 inserts the first data into the normal buffer. When the occupancy of the bypass buffer is less than or equal to the second threshold number, the method 500 continues to 510.

At 510, the input arbiter determines whether the first output identifier corresponding to the first data associated with the first packet matches a fourth output identifier corresponding to fourth data in the bypass buffer (associated with a fourth packet). If a match is found, then the method 500 proceeds to 530, and the input arbiter inserts the first data into the normal buffer. When no match is found, the method continues to 520, and the first data is inserted into the bypass buffer.

When the method 500 has finished either inserting the first data into the bypass buffer, at 520, or inserting the first data into the normal buffer, at 530, the method 500 continues to 540. At 540, the input arbiter forwards the first packet to the output when the first data associated with the first packet is within a first set of data in the normal buffer that includes less than a fourth threshold number of packets (or packet notifications) or within a second set of data in the bypass buffer that includes less than a fourth threshold number of packets (or packet notifications). Thus, the input arbiter selects data from either the normal buffer or the bypass buffer to use in forwarding packets through the switching fabric.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon. In a particular embodiment, the disclosed methods are implemented in software that is embedded in processor readable storage medium and executed by a processor, which includes but is not limited to firmware, resident software, microcode, etc.

Further, embodiments of the present disclosure may take the form of a computer program product accessible from a computer-usable or computer-readable storage medium providing program code for use by or in connection with a computer or any instruction execution system. For the purposes of this description, a non-transitory computer-usable or computer-readable storage medium may be any apparatus that may tangibly embody a computer program and that may contain, store, communicate, propagate, or transport the program for use by or in connection with the instruction execution system, apparatus, or device. For example, referring to FIGS. 1, 2, and 3, the apparatuses 100, 200, and 300 may be implemented as a computer program product accessible from a computer-usable or computer-readable storage medium providing program code for use by or in connection with a computer or any instruction execution system. Additionally, referring to FIGS. 4 and 5, the methods 400 and 500 may be implemented as a computer program product accessible from a computer-usable or computer-readable storage medium providing program code for use by or in connection with a computer or any instruction execution system.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A method of input buffering a switching device, the method comprising:
   receiving a first packet at an input of a switching device, wherein the first packet includes a first output identifier corresponding to an output of the switching device; and
   determining whether to insert first data associated with the first packet into a normal buffer of the input, the determination comprising:
      determining whether the first output identifier matches a second output identifier corresponding to second data in the normal buffer, wherein the second data is associated with a second packet; and
      inserting first data into the normal buffer when the first output identifier matches the second output identifier.

2. The method of claim 1, wherein the normal buffer includes a third output identifier corresponding to third data in the normal buffer, wherein the third data is associated with a third packet, wherein the first output identifier is different than the third output identifier.

3. The method of claim 1, wherein the first data comprises the first packet.

4. The method of claim 1, further comprising generating a packet notification that includes the first output identifier, wherein the first data comprises the packet notification.

5. The method of claim 1, further comprising:
   determining, when the first output identifier does not match any output identifier corresponding to any data in the normal buffer that is associated with any other packet, whether a first occupancy of the normal buffer is less than a first threshold number;
   inserting the first data into the normal buffer when the first occupancy of the normal buffer is less than the first threshold number;
   determining, when the first occupancy of the normal buffer is greater than or equal to the first threshold number, whether a second occupancy of a bypass buffer is greater than a second threshold number; and
   inserting the first data into the normal buffer when the second occupancy of the bypass buffer is greater than the second threshold number.

6. The method of claim 5, further comprising:
   determining, when the second occupancy of the bypass buffer is less than or equal to the second threshold number, whether the first output identifier matches a fourth output identifier corresponding to fourth data in the bypass buffer, wherein the fourth data is associated with a fourth packet; and
   inserting the first data into the normal buffer when the first output identifier matches the fourth output identifier.

7. The method of claim 6, further comprising:
   inserting the first data into the bypass buffer when the first output identifier does not match any output identifier corresponding to any data in the bypass buffer that is associated with any other packet.

8. The method of claim 1, further comprising:
   forwarding the first packet to the output when:
      the first data associated with the first packet is within a first set of data in the normal buffer, the first set of data including fewer than a third threshold number of packets, or within a second set of data in a bypass buffer, the second set of data including fewer than a fourth threshold number of packets.

9. An apparatus comprising:
   an input configured to receive a first packet, wherein the first packet includes a first output identifier corresponding to an output, the input comprising:
      a normal buffer;
      a bypass buffer; and an input arbiter, wherein the input arbiter is configured to:
  determine whether to insert first data associated with the first packet into the normal buffer based at least in part on whether the first output identifier matches a second output identifier corresponding to second data in the normal buffer, wherein the second data is associated with a second packet; and
  insert the first data into the normal buffer when the first output identifier matches the second output identifier; and
a plurality of outputs coupled to the input.

10. The apparatus of claim 9, wherein the input arbiter is further configured to insert the first data into the normal buffer when the normal buffer includes a third output identifier corresponding to third data in the normal buffer, wherein the third data is associated with a third packet, wherein the first output identifier is different than the third output identifier.

11. The apparatus of claim 9, wherein the first data comprises the first packet.

12. The apparatus of claim 9, wherein the normal buffer is a first-in first-out queue.

13. The apparatus of claim 9, wherein the input arbiter is implemented as hardware logic, and further comprises a switching fabric responsive to the input arbiter and configured to switch data from the input to the plurality of outputs.

14. The apparatus of claim 9, wherein the input arbiter is further configured to:
  insert the first data into the normal buffer when a first occupancy of the normal buffer is less than a first threshold number;
  insert the first data into the normal buffer when a second occupancy of the bypass buffer is greater than a second threshold number;
  insert the first data into the normal buffer when the first output identifier matches a third output identifier corresponding to third data in the bypass buffer, wherein the third data is associated with a third packet; and
  insert the first data into the bypass buffer when the first output identifier does not match any output identifier corresponding to any data in the bypass buffer that is associated with any other packet.

15. A computer program product for input buffering a switching device, the computer program product comprising:
  a computer readable storage medium having computer readable program code embodied therewith, the computer readable program code comprising computer readable program code configured to:
  receive a first packet at an input of a switching device, wherein the first packet includes a first output identifier corresponding to an output of the switching device; and
  determine whether to insert first data associated with the first packet into a normal buffer of the input, the determination comprising:
    determining whether the first output identifier matches a second output identifier corresponding to second data in the normal buffer, wherein the second data is associated with a second packet; and
    inserting first data into the normal buffer when the first output identifier matches the second output identifier.

16. The computer program product of claim 15, wherein the normal buffer includes a third output identifier corresponding to third data in the normal buffer that is associated with a third packet, wherein the first output identifier is different than the third output identifier.

17. The computer program product of claim 16, wherein the first data comprises the first packet.

18. The computer program product of claim 16, further comprising computer readable program code configured to generate a packet notification that includes the output identifier, wherein the first data comprises the packet notification.

19. The computer program product of claim 16, further comprising computer readable program code configured to:
  determine whether a first occupancy of the normal buffer is less than a first threshold number;
  insert the first data into the normal buffer when the first occupancy of the normal buffer is less than the first threshold number;
  determine whether a second occupancy of a bypass buffer is greater than a second threshold number;
  insert the first data into the normal buffer when the second occupancy of the bypass buffer is greater than a second threshold number;
  determine whether the first output identifier matches a fourth output identifier corresponding to fourth data in the bypass buffer, wherein the fourth data is associated with a fourth packet;
  insert the first data into the normal buffer when the first output identifier matches the fourth output identifier; and
  insert the first data into the bypass buffer when the first output identifier does not match any output identifier corresponding to any data in the bypass buffer that is associated with any other packet.

20. The computer program product of claim 19, further comprising computer readable program code configured to forward the first packet to the output when:
  the first data associated with the first packet is within a first set of data in the normal buffer that includes fewer than a third threshold number of packets; or
  the first data is within a second set of data in the bypass buffer that includes fewer than a fourth threshold number of packets.

* * * * *